US009656748B2

(12) United States Patent
Jing (10) Patent No.: US 9,656,748 B2
(45) Date of Patent: May 23, 2017

(54) VTOL AIRCRAFT WITH A THRUST-TO-WEIGHT RATIO SMALLER THAN 0.1

(71) Applicant: Chen Li Jing, Bougival (FR)

(72) Inventor: Chen Li Jing, Bougival (FR)

( * ) Notice: Subject to any disclaimer, the term of this patent is extended or adjusted under 35 U.S.C. 154(b) by 209 days.

(21) Appl. No.: 14/329,949

(22) Filed: Jul. 13, 2014

(65) Prior Publication Data

US 2015/0298805 A1    Oct. 22, 2015

(30) Foreign Application Priority Data

Apr. 17, 2014   (EP) ..................... 14075023

(51) Int. Cl.
| | | |
|---|---|---|
| *B64C 29/00* | (2006.01) | |
| *B64C 21/04* | (2006.01) | |
| *B64C 9/00* | (2006.01) | |
| *B64C 15/02* | (2006.01) | |
| *B64C 23/00* | (2006.01) | |
| *B64D 27/16* | (2006.01) | |

(52) U.S. Cl.
CPC ............... *B64C 29/00* (2013.01); *B64C 9/00* (2013.01); *B64C 15/02* (2013.01); *B64C 21/04* (2013.01); *B64C 23/005* (2013.01); *B64C 29/005* (2013.01); *B64C 29/0066* (2013.01); *B64D 27/16* (2013.01); *B64C 2009/005* (2013.01); *Y02T 50/166* (2013.01)

(58) Field of Classification Search
USPC ............ 244/12.5, 207, 204, 210, 35 R, 23 D
See application file for complete search history.

(56) References Cited

U.S. PATENT DOCUMENTS

| | | | | |
|---|---|---|---|---|
| 3,971,534 | A * | 7/1976 | Grotz ........................ | B64C 9/20 239/265.33 |
| 4,848,701 | A * | 7/1989 | Belloso ................... | B64C 9/146 244/12.5 |
| 5,158,251 | A * | 10/1992 | Taylor ...................... | B64C 9/38 244/199.3 |
| 6,729,575 | B2 * | 5/2004 | Bevilaqua ........... | B64C 29/0066 244/12.3 |
| 7,461,811 | B2 * | 12/2008 | Milde, Jr. ................. | B64C 3/56 244/12.3 |
| 7,726,609 | B2 * | 6/2010 | Shmilovich .............. | B64C 9/38 244/204 |
| 7,823,826 | B1 * | 11/2010 | Lewis ..................... | B64C 21/04 244/12.5 |
| 8,579,227 | B2 * | 11/2013 | Burnham ................ | B64C 27/20 244/12.5 |
| 8,807,484 | B2 * | 8/2014 | Raposeiro ............. | B64C 1/1453 244/12.5 |

(Continued)

*Primary Examiner* — Christopher P Ellis (57) ABSTRACT

VTOL aircraft with a thrust-to-weight ratio smaller than 0.1, during vertical take-off/landing, obtains an another lift, besides a lift generated by low-temp bypass duct (15) directing the low-temp air (18) from the turbofan engine (3) to flow, through its outlet (19) in form of low-temp planar jet (20), over the upper surface of the wing and in the direction of the wingspan, by high-temp bypass duct (15) directing the high-temp air (18) from the turbofan engine (3) to flow, through its outlet (12) in form of high-temp planar jet (13), above the low-temp planar jet (20) in the direction of the wingspan but not burn up the wing and enables the ailerons (1, 2) to control the balances of the aircraft more efficiently.

6 Claims, 6 Drawing Sheets

B - B (56) References Cited

U.S. PATENT DOCUMENTS

2012/0104153 A1\* 5/2012 van der Westhuizen .......... B64C 27/025
                                                              244/17.11
2014/0061387 A1\* 3/2014 Reckzeh ................... B64C 9/24
                                                              244/208

\* cited by examiner

VTOL AIRCRAFT WITH A THRUST-TO-WEIGHT RATIO SMALLER THAN 0.1

CROSS-REFERENCE TO RELATED APPLICATION

This application is claims foreign priority benefit under 35 U.S.C. §119 of Patent Application EP 14075023.3 filed on 17 Apr. 2014, the contents of which are herein incorporated by reference.

BACKGROUND OF THE INVENTION

This invention relates to aircraft, and more particularly, to aircraft with VTOL technology.

Currently, there are three kinds of traditional VTOL technologies which get vertical lift from high-speed air flowing over upper surface of the aircraft. In the first one such as patent No: US201210068020, a fan independent of a main engine increases speed of low-temp air flowing over the upper surface of wing along the direction of the chord, thereby increasing vertical lift. In this way, this fan less efficiently increases the vertical lift; In the second one such as patent No: GB792993, a high-temp bypass duct directs high-temp air by a valve from a nozzle of a jet engine to flow radially over the upper surface of the aircraft, thereby generating vertical life. In this way, the high-temp bypass duct generates the vertical lift more efficiently than the first one but the upper surface of the aircraft might be burnt up; In the third one such as patent No: GB2469612, a low-temp bypass duct directs low-temp air, with a rotatable nozzle, from a low-temp duct of a turbofan engine to flow over the upper surface of the wing along the direction of the chord, thereby generating vertical lift. But another rotatable nozzle spouts high-temp air downwardly from a high-temp duct of a turbofan engine, thereby generating another vertical lift less efficiently. In this way, the low-temp bypass duct generates the vertical lift more efficiently than above ways but thin slot outlet of the low-temp bypass duct, set in the direction of the chord, enables a part of vertical lift to lose in the long low-temp bypass duct and the problem, how the high-temp air is directed to obtain more vertical lift from the upper surface of the aircraft but not burn up it, is not solved. Because of these limitations, VTOL is impossible for aircraft, and more particularly for large aircraft with thrust-to-weight ratio smaller than 0.1.

BRIEF SUMMARY OF THE INVENTION

The present invention however, can achieve VTOL on aircraft with a thrust-to-weight ratio smaller than 0.1, the aircraft comprising: ailerons; a turbofan engine including a low-temp duct with an openable and closable propelling nozzle and a high-temp duct with an openable and closable propelling nozzle; a low-temp bypass duct including an openable and closable inlet connected to the low-temp duct, an outer wall, an inner wall and a thin slot outlet set on the upper surface of wing and in the direction of the wingspan; a high-temp bypass duct including an openable and closable inlet connected to the high-temp duct, an outer wall and a thin slot outlet set above the thin slot outlet of the low-temp bypass duct in the direction of the wingspan.

According to its first characteristic, the following are true:

The low-temp duct spouts directly low-temp air into atmosphere to generate a thrust during forward flight when the propelling nozzle of low-temp duct is opened and the inlet of the low-temp bypass duct is closed.

The high-temp duct spouts directly high-temp air into atmosphere to generate another thrust during forward flight when the propelling nozzle of high-temp duct is opened and the inlet of the high-temp bypass duct is closed.

The low-temp bypass duct directs the low-temp air from the low-temp duct to flow, in form of low-temp planar jet, over the upper surface of the wing and in the direction of the wingspan, thereby generating a vertical lift and enabling the ailerons to control horizontal and vertical balances of the aircraft during vertical take-off/landing when the propelling nozzle of low-temp duct is closed and the inlet of the low-temp bypass duct is opened.

The high-temp bypass duct directs the high-temp air from the high-temp duct to flow, in form of high-temp planar jet, above the low-temp planar jet in the direction of the wingspan, thereby generating another vertical lift and enabling the ailerons to control horizontal and vertical balances of the aircraft more efficiently during vertical take-off/landing when the propelling nozzle of high-temp duct is closed and the inlet of the high-temp bypass duct is opened.

The thin slot outlet of the high-temp bypass duct, set above the thin slot outlet of the low-temp bypass duct, enables the high-temp planar jet not to burn up the upper surface of the aircraft during vertical take-off/landing.

DETAILED DESCRIPTION OF THE INVENTION

Referring to above drawings, an aircraft with this invention comprises: ailerons (1, 2); a turbofan engine (3) including a low-temp duct (6) with an openable and closable propelling nozzle (7) and a high-temp duct (4) with an openable and closable propelling nozzle (5); a low-temp bypass duct (15) including an openable and closable inlet (14) connected to the low-temp duct 6), an outer wall (16), an inner wall (17) and a thin slot outlet (19) set on the upper surface of the wing and in the direction of the wingspan; a high-temp bypass duct (9) including an openable and closable inlet (8) connected to the high-temp duct (4), an outer wall (10) and a thin slot outlet (12) set above a thin slot outlet (19) of the low-temp bypass duct (15) and in the direction of the wingspan.

Figure 1:
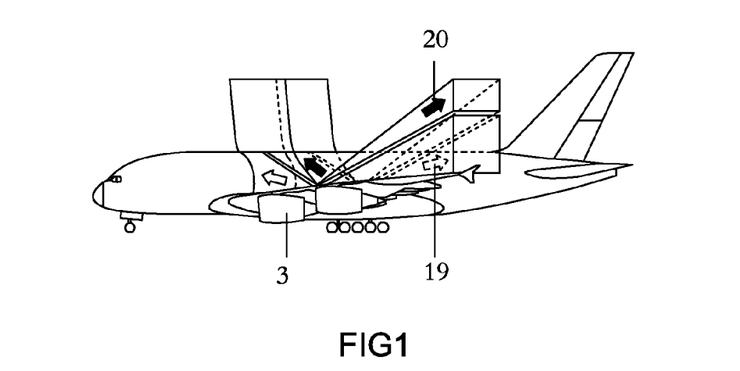
FIG. 1 is a side view of an aircraft with this invention during vertical take-off and landing.
Figure 2:
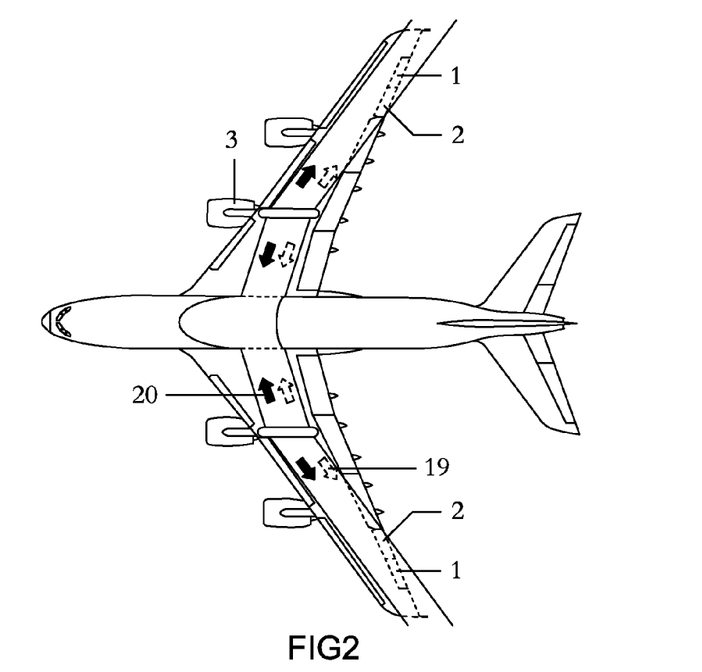
FIG. 2 is a top view of an aircraft with this invention during vertical take-off and landing.
Figure 3:
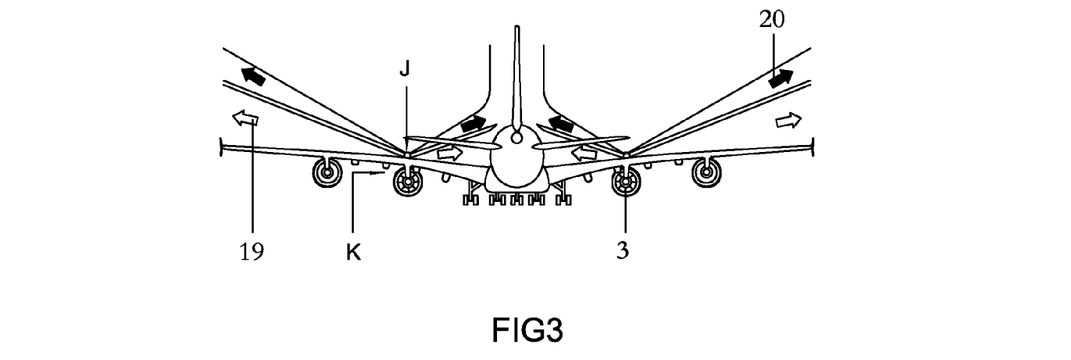
FIG. 3 is a rear view of an aircraft with this invention during vertical take-off and landing.
Figure 4:
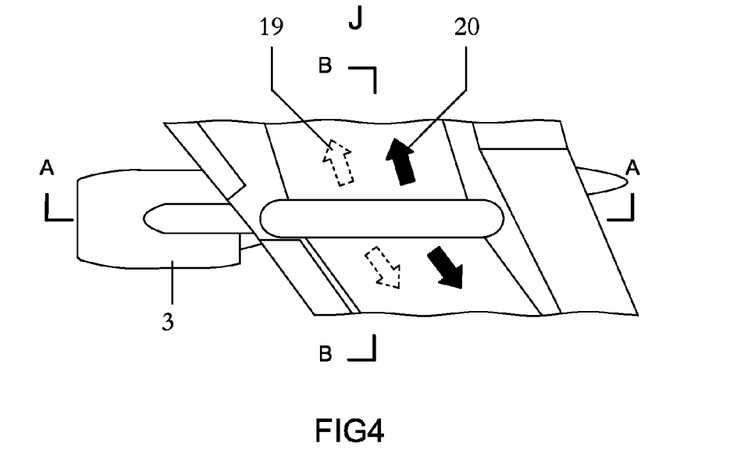
FIG. 4 is J local view for FIG. 3.
Figure 5:
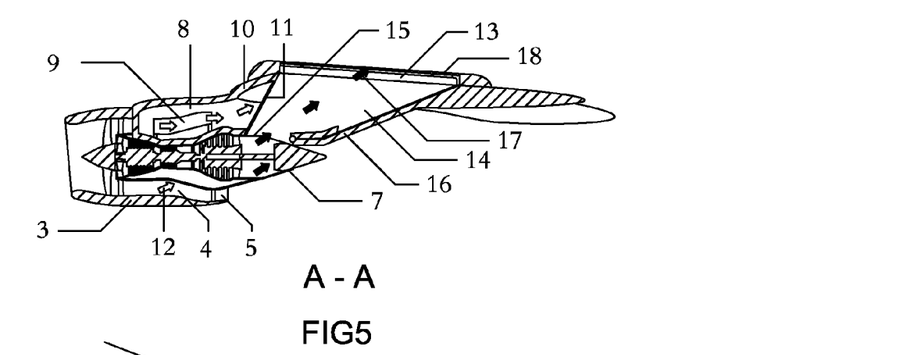
FIG. 5 is A-A Section for FIG. 4
Figure 6:
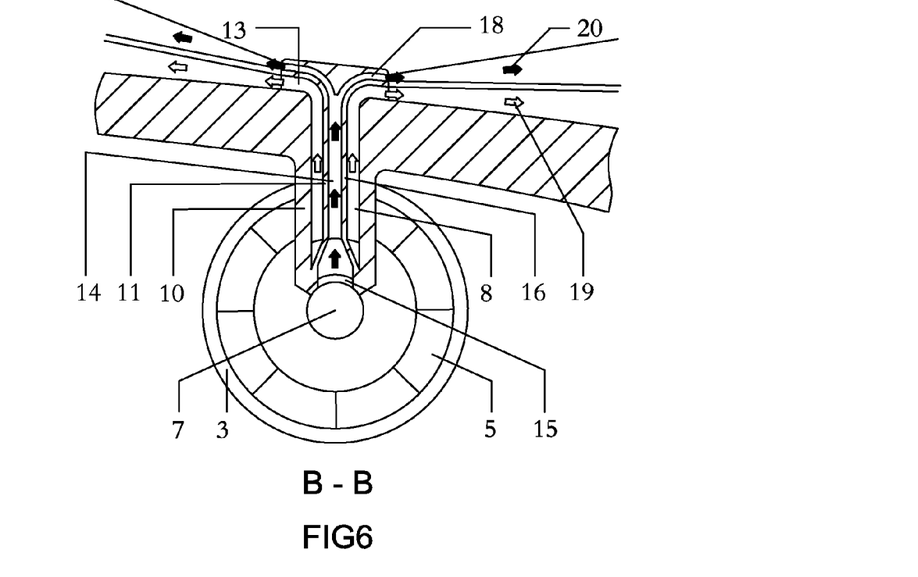
FIG. 6 is B-B Section for FIG. 4.
Figure 7:
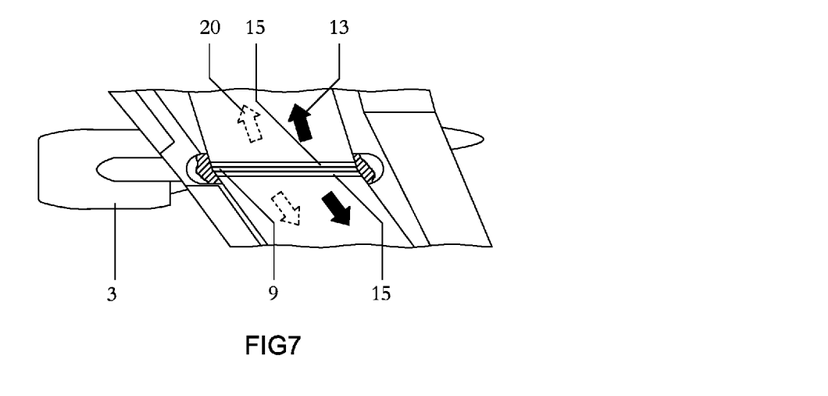
FIG. 7 is part Section for FIG. 4.
Figure 8:
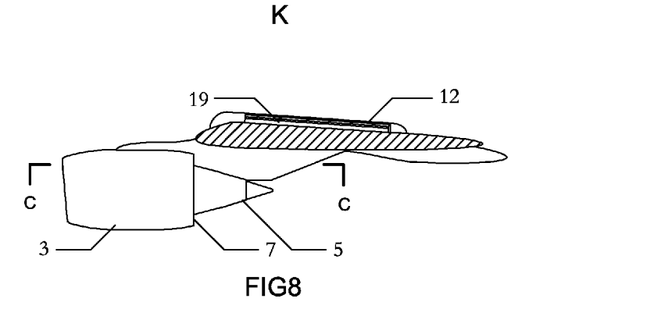
FIG. 8 is K local view for FIG. 3.
Figure 9:
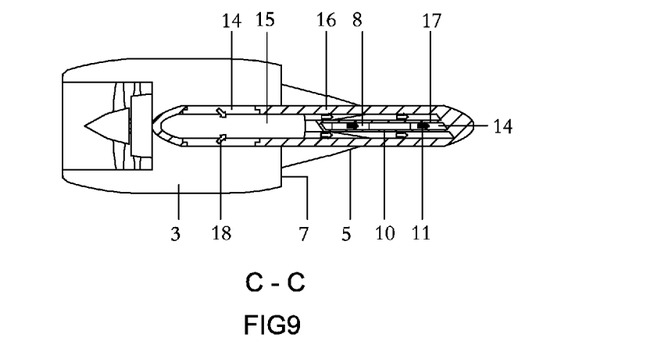
FIG. 9 is C-C Section for FIG. 8.

Referring to FIG. (1-9), during vertical take-off/lading, the propelling nozzles (5, 7) of the low-temp duct (6) and the high-temp duct (4) of the turbofan engine (3) are closed. At same time, the inlets (8, 14) of the low-temp bypass duct (15) and the high-temp bypass duct (9) are opened. Then, the turbofan engine (3) starts to supply the low-temp air (18) to the low-temp duct (6) and the high-temp air (11) to the high-temp duct (4). Now, the low-temp bypass duct (15) directs the low-temp air (18) from the low-temp duct (6) and enables it, in form of low-temp planar jet (20), to flow over the upper surface of the wing and in the direction of wingspan. Because the velocity of the air flowing over the upper surface of the wing is higher than that over the lower surface of the wing, and according to Principle of Bernoulli stating an increase in the speed occurs simultaneously with a decrease in pressure, a vertical lift is generated on the wing due to the lower pressure on the upper surface of the wing than that on the lower surface of the wing and the low-temp planar jet (20) enables the ailerons to control horizontal and vertical balances of the aircraft. Similarly, the high-temp bypass duct (9) directs the high-temp air (11) from the high-temp duct (4) and enables it, in form of the high-temp planar jet (13), to flow above the low-temp planar jet (20) in the direction of wingspan, thereby generating another vertical lift and enabling the ailerons to control horizontal and vertical balances of the aircraft more efficiently. The thin slot outlet (12) of the high-temp bypass duct (9), set above the thin slot outlet (19) of the low-temp bypass duct (15), enables the high-temp planar jet (13) not to burn up the upper surface of the wing.

Figure 10:
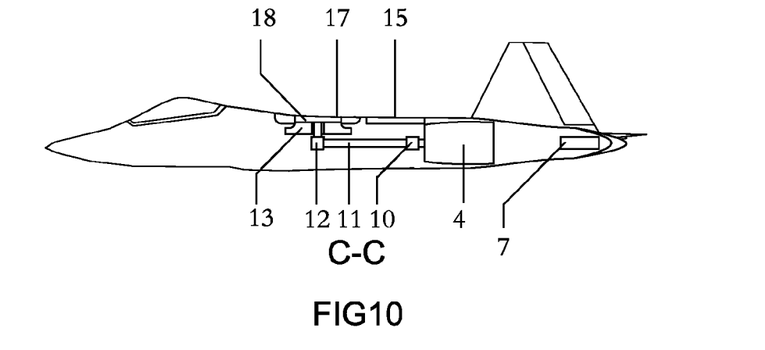
FIG. 10 is a side view of an aircraft with this invention during forward flight.
Figure 11:
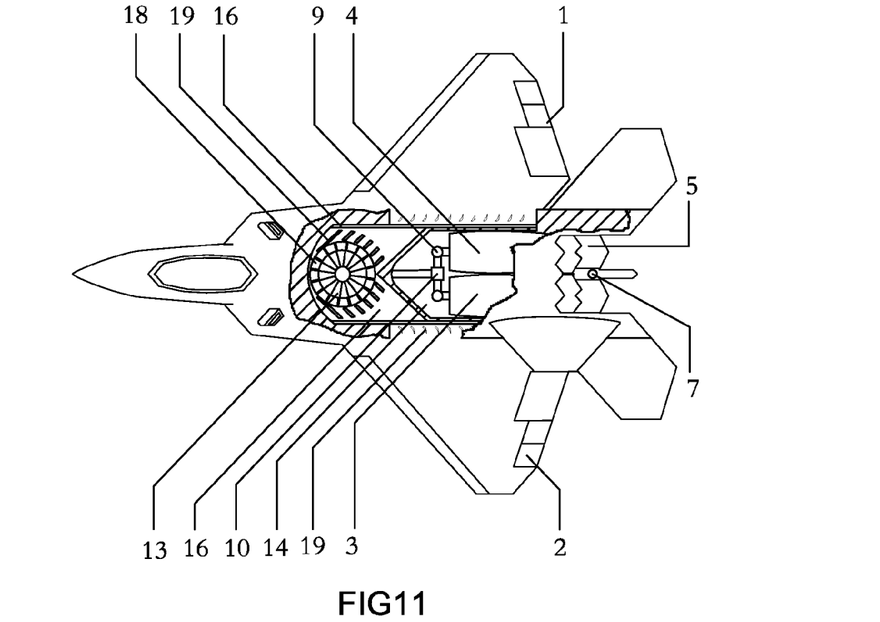
FIG. 11 is a top view of an aircraft with this invention during forward flight.
Figure 12:
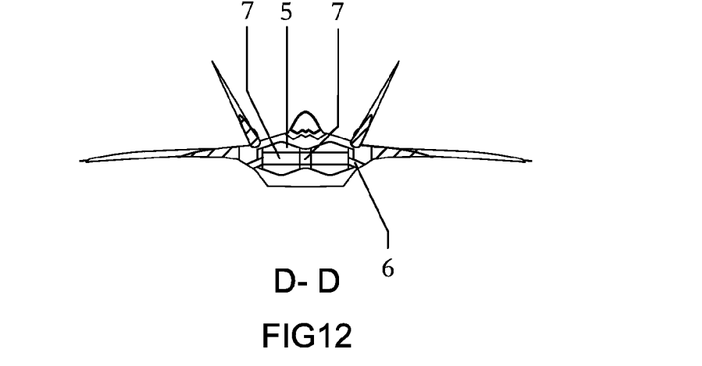
FIG. 12 is a rear view of an aircraft with this invention during forward flight.
Figure 13:
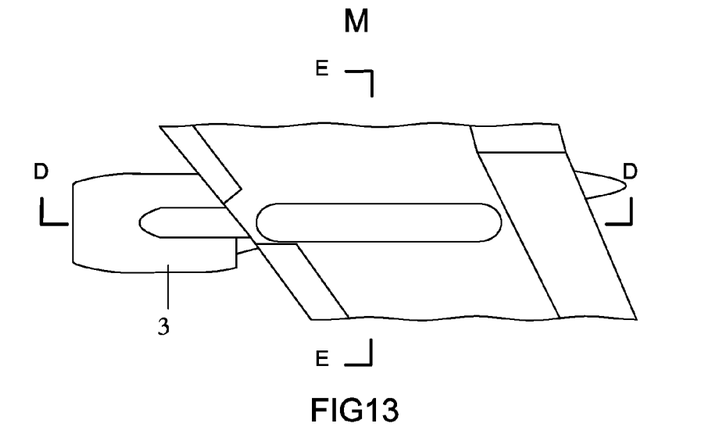
FIG. 13 is M local view for FIG. 12.
Figure 14:
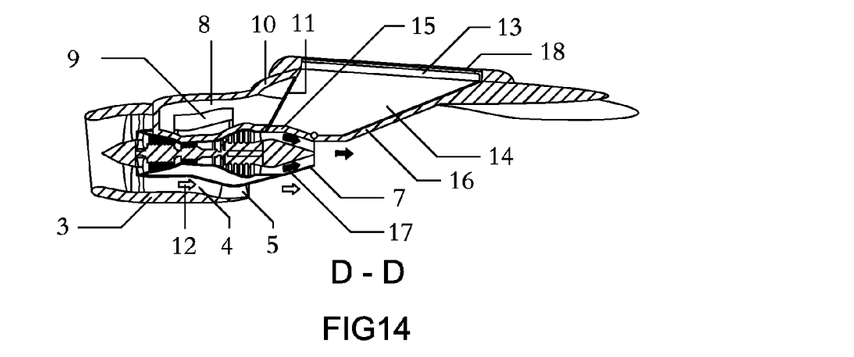
FIG. 14 is D-D Section for FIG. 13.
Figure 15:
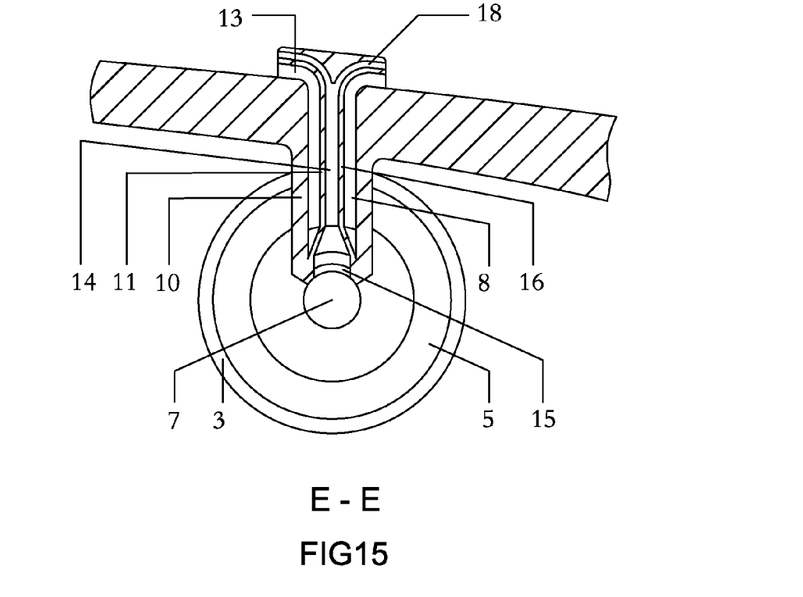
FIG. 15 is E-E Section for FIG. 13.
Figure 16:
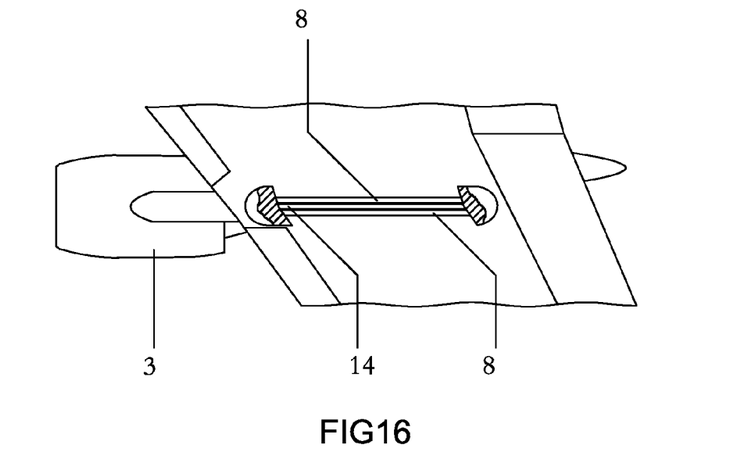
FIG. 16 is part Section for FIG. 13.
Figure 17:
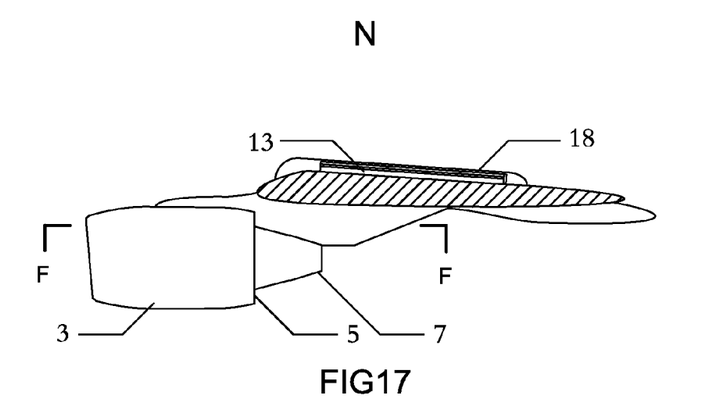
FIG. 17 is N local view for FIG. 12.
Figure 18:
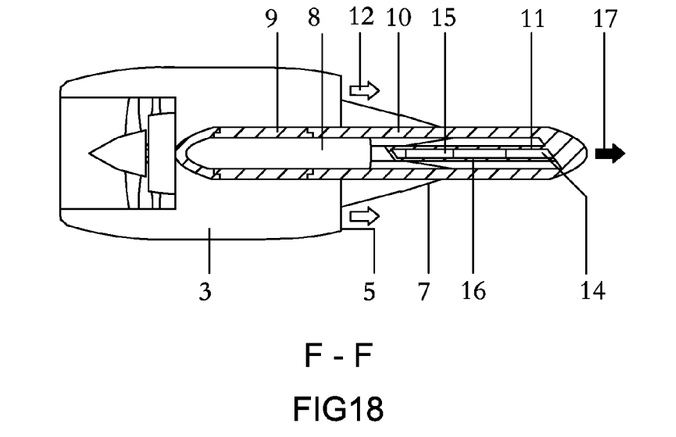
FIG. 18 is F-F Section for FIG. 17.

Referring to FIG. (10-18), during forward flight, the propelling nozzles (5, 7) of the low-temp duct (6) and high-temp duct (4) of the turbofan engine (3) are opened. At same time, the inlets (8, 14) of the low-temp bypass duct (15) and the high-temp bypass duct (9) are closed. Then, the low-temp air (18) and the high-temp air (11) spout directly from the propelling nozzles (5, 7) of the low-temp duct (6) and the high-temp duct (4) into atmosphere to generate thrusts.

All the formulas and calculations for this invention are listed in Annex 1.

All the formulas and calculations used to retrofit an Airbus A-380 based on this invention are listed in Annex 2.

This invention can be used to retrofit an existing aircraft to achieve VTOL or manufacture a VTOL aircraft with a thrust-to-weight ratio smaller than 0.1.

ANNEX 1

| | | |
|---|---|---|
| P | Atmospheric pressure | (Unit: Pa) |
| R | Ideal gas constant | (Unit: J. K$^{-1}$. mol$^{-1}$) |
| $\rho_0$ | Low-temp jet density at the outlet | (Unit:kg/m$^3$) |
| $\rho_1$ | Atmospheric density | (Unit:kg/m$^3$) |
| $\rho$ | Jet density on the cross-section | (Unit: kg/m$^3$) |
| $\rho_m$ | Jet density of the shaft | (Unit: kg/m$^3$) |
| $T_0$ | Jet temp at the low-temp outlet | (Unit: K) |
| $T_1$ | Atmospheric temp | (Unit: K) |
| T | Jet temp on the cross-section | (Unit: K) |
| $V_0$ | Jet speed at the outlet of low-temp bypass duct | (Unit: m/s) |
| $V_0'$ | Jet speed at the outlet of high-temp bypass duct | (Unit: m/s) |
| V | Jet speed on the cross-section | (Unit: m/s) |
| $V_m$ | Jet speed of shaft | (Unit: m/s) |
| $h_0$ | Jet height of the outlet | (Unit: m) |
| $h_m$ | Jet height of the cross-section | (Unit: m) |
| h | Jet height on the cross-section | (Unit: m) |
| L | Width of the outlet | (Unit: m) |
| C | Gas specific volume | (Unit: m$^3$/kg) |
| M | Molar mass | (Unit: kg/mol) |
| Q | Air inflow of turbofan engine | (Unit: kg/s) |
| B | Bypass ratio of turbofan engine | (Dimensionless unit) |
| G | Maximum take-off weight | (Unit: T) |
| X | Distance between any point and outlet of low-temp bypass duct in jet direction | (Unit: m) |
| $X_1$ | Distance between wing root and low-temp outlet in jet direction | (Unit: m) |
| $X_2$ | Distance between low-temp outlet and crossover point at which jet boundary intersects with trailing edge of wing in jet direction | (Unit: m) |
| $X_3$ | Distance between wingtip and low-temp outlet in jet direction | (Unit: m) |
| α | Angle between jet boundary and trailing edge of wing | (Unit: °) |
| β | Angle between chord line of wing and long side of outlet | (Unit: °) |
| γ | Dihedral angle of wing | (Unit: °) |
| δ | Sweep forward angle of jet | (Unit: °) |
| ø | Included angle between axis of low-temp jet and one of the high-temp jet | (Unit: °) |
| θ | Sweep back angle of jet | (Unit: °) |
| F | Total vertical lift | (Unit: T) |
| $F_1$ | Lift between wing root and low-temp outlet | (Unit: T) |
| $F_2$ | Lift between low-temp outlet and crossover point at which jet boundary intersects with trailing edge of wing | (Unit: T) |
| $F_3$ | Lift between wingtip and low-temp outlet | (Unit: T) |
| $F_4$ | Downward pressure generated by slant upward deflected jet | (Unit: T) |
| $F_5$ | Thrust generated by jet of low-temp outlet | (Unit: T) |
| $F_6$ | Thrust generated by jet of high-temp outlet | (Unit: T) |
| b | Constant | (Dimensionless unit) |
| d | Constant | (Dimensionless unit) |
| C | Constant | (Dimensionless unit) |
| $n_1$ | S/N of turbofan engine | (Dimensionless unit) |
| $n_2$ | S/N of turbofan engine used in vertical Take-off/landing | (Dimensionless unit) |
| $n_3$ | S/N of outlet of low-temp bypass duct | (Dimensionless unit) |
| TWR | Thrust-to-weight ratio of aircraft | (Dimensionless unit) |

According to thermodynamic, relative values of the enthalpy of various jet cross-sections are same each other when pressures of these jet cross-sections are equal and the value of surrounding gas is starting value.

And according to the feature of planar jet, it just spread on the flat which is perpendicular to the outlet section.

$$P = \frac{\rho_0}{M} RT_0 = \frac{\rho_1}{M} RT_1 = \frac{\rho}{M} RT$$

$$\rho_0 V_0 h_0 LC(T_0 - T_1) = \int \rho VLC(T - T_1) dh$$

-continued
$$\rho_0 V_0 h_0 \left(\frac{1}{\rho_0} - \frac{1}{\rho_1}\right) = \int \rho V \left(\frac{1}{\rho} - \frac{1}{\rho_1}\right) dh$$

And according to the similarity of velocity and density distribution on the various jet sections, $$\sqrt{\frac{V}{V_m}} = \frac{\rho - \rho_1}{\rho_m - \rho_1} = 1 - \left(\frac{h}{h_m}\right)^{1.5} \quad (1)$$

$$h_0 V_0 (\rho_0 - \rho_1) = \int (\rho - \rho_1) V dh$$

$$\frac{h_0 V_0 (\rho_0 - \rho_1)}{(\rho_m - \rho_1) V_m h_m} =$$

$$\int \frac{(\rho - \rho_1) V}{(\rho_m - \rho_1) V_m h_m} dh = \int_0^{h_m} \left[1 - \left(\frac{h}{h_m}\right)^{1.5}\right]^3 \cdot \frac{1}{h_m} dh =$$

$$\int_0^1 \left[1 - \left(\frac{h}{h_m}\right)^{1.5}\right]^3 d\left(\frac{h}{h_m}\right) = 0.3682$$

$$(\rho_m - \rho_1) = \frac{h_0 V_0 (\rho_0 - \rho_1)}{0.3682 \cdot V_m h_m}$$

According to dynamic characteristic of jet, momentums of the various sections are same each other in case of equal pressures.

$$\rho_0 L h_0 V_0^2 = \int \rho L V^2 dh \quad (2)$$

$$\rho_0 h_0 V_0^2 = \int \rho V^2 dh = \int (\rho - \rho_1) V^2 dh + \int \rho_1 V^2 dh$$

$$\frac{\rho_0 h_0 V_0^2}{(\rho_m - \rho_1) V_m^2 h_m} =$$

$$\int_0^1 \frac{(\rho - \rho_1) V^2}{(\rho_m - \rho_1) V_m^2} d\left(\frac{h}{h_m}\right) + \int_0^1 \frac{\rho_1 V^2}{(\rho_m - \rho_1) V_m^2} d\left(\frac{h}{h_m}\right) =$$

$$\int_0^1 \left[1 - \left(\frac{h}{h_m}\right)^{1.5}\right]^5 d\left(\frac{h}{h_m}\right) +$$

-continued
$$\frac{\rho_1}{(\rho_m - \rho_1)} \int_0^1 \left[1 - \left(\frac{h}{h_m}\right)^{1.5}\right]^4 d\left(\frac{h}{h_m}\right) = 0.2786 + \frac{0.3156 \rho_1}{(\rho_m - \rho_1)}$$

$$\frac{0.3682 V_0 \rho_0}{V_m (\rho_0 - \rho_1)} = 0.2786 + \frac{0.1162 h_m V_m \rho_1}{h_0 V_0 (\rho_0 - \rho_1)}$$

Substitute (1) into (2):

$$\frac{0.1162 h_m \rho_1}{h_0 \rho_0} \cdot \left(\frac{V_m}{V_0}\right)^2 + 0.2786 \frac{(\rho_0 - \rho_1)}{\rho_0} \cdot \left(\frac{V_m}{V_0}\right) - 0.3682 = 0 \quad (3)$$

$$\frac{V_m}{V_0} = \frac{\frac{0.2786(\rho_1 - \rho_0)}{\rho_0} + \sqrt{\left[\frac{0.2786(\rho_0 - \rho_1)}{\rho_0}\right]^2 + \frac{0.1711 h_m \rho_1}{h_0 \rho_0}}}{\frac{0.2324 h_m \rho_1}{h_0 \rho_0}}$$

$$V_m = \frac{1 + \sqrt{1 + \frac{0.1711 h_m \rho_0 \rho_1}{0.2786^2 h_0 (\rho_0 - \rho_1)^2}}}{\frac{0.2324 h_m \rho_1}{0.2786 h_0 (\rho_0 - \rho_1)}} V_0$$

Substitute (3) into (1)

$$(\rho_m - \rho_1) = \frac{h_0 V_0 (\rho_0 - \rho_1)}{0.3682 \cdot V_m h_m} \quad (4)$$

$$\rho_m = \rho_1 - \frac{\frac{0.2324}{0.3682 \times 0.2786} \rho_1}{1 + \sqrt{1 + \frac{0.1711 h_m \rho_0 \rho_1}{0.2786^2 h_0 (\rho_0 - \rho_1)^2}}}$$

When $X \leq X_1$ or $X \leq X_2$ $$F = P - \left[P - \left(P - \frac{1}{2} \int \rho_m V_m^2\right)\right] L dx = \frac{1}{2} \int \rho_m V_m^2 L dx$$

Substitute (3), (4) into (2)

$$= \frac{1}{2} \int_0^x \left[\rho_1 - \frac{\frac{0.2324}{0.3682 \times 0.2786} \rho_1}{1 + \sqrt{1 + \frac{0.1711 h_m \rho_0 \rho_1}{0.2786^2 h_0 (\rho_0 - \rho_1)^2}}}\right] \cdot \left[\frac{1 + \sqrt{1 + \frac{0.1711 h_m \rho_0 \rho_1}{0.2786^2 h_0 (\rho_0 - \rho_1)^2}}}{\frac{0.2324 h_m \rho_1}{0.2786 h_0 (\rho_0 - \rho_1)}}\right]^2 \cdot V_0^2 L dx$$

$$= \frac{1}{2} \int_0^x \left\{\rho_1 \left[\frac{1 + \sqrt{1 + \frac{0.1711 h_m \rho_0 \rho_1}{0.2786^2 h_0 (\rho_0 - \rho_1)^2}}}{\frac{0.2324 h_m \rho_1}{0.2786 h_0 (\rho_0 - \rho_1)}}\right]^2 - \frac{0.2324}{0.3682 \times 0.2786} \rho_1 \cdot \left[\frac{1 + \sqrt{1 + \frac{0.1711 h_m \rho_1 \rho_0}{0.2786^2 h_0 (\rho_1 - \rho_0)^2}}}{\frac{0.2324 h_m \rho_1}{0.2786 h_0 (\rho_1 - \rho_0)}}\right]\right\} \cdot V_0^2 L dx =$$

$$\frac{1}{2} \int_0^x \rho_1 \left\{\frac{2 + \frac{0.1711 h_m \rho_1 \rho_0}{0.2786^2 h_0 (\rho_1 - \rho_0)^2} + 2\sqrt{1 + \frac{0.1711 h_m \rho_1 \rho_0}{0.2786^2 h_0 (\rho_1 - \rho_0)^2}}}{\left[\frac{0.2324 h_m \rho_1}{0.2786 h_0 (\rho_1 - \rho_0)}\right]^2} - \frac{\left(\frac{0.2324}{0.3682 \times 0.2786} + \frac{0.2324}{0.3683 \times 0.2786} \sqrt{1 + \frac{0.1711 h_m \rho_1 \rho_0}{0.2786^2 h_0 (\rho_1 - \rho_0)^2}}\right)}{\left(\left[\frac{0.2324 h_m \rho_1}{0.2786 h_0 (\rho_1 - \rho_0)}\right]^2\right)}\right\} \cdot$$

$$V_0^2 dx = \frac{1}{2} \int_0^x \left\{ \frac{0.1711\rho_0}{0.2324^2 \left(\frac{h_m}{h_0}\right)} - \frac{1.2655}{\left[\frac{0.2324\rho_1}{0.2786(\rho_1-\rho_0)}\right]^2 \left(\frac{h_m}{h_0}\right)^2} - \frac{0.2655\sqrt{1+\frac{0.1711\rho_1\rho_0}{0.2786^2(\rho_1-\rho_0)^2} \cdot \left(\frac{h_m}{h_0}\right)}}{\left[\frac{0.2324\rho_1}{0.2786(\rho_1-\rho_0)}\right]^2} \right\} \cdot V_0^2 L dx$$

Because of $$\frac{h_m}{h_0} = 2.44\left(\frac{0.12x}{h_0} + 0.41\right)$$

When $X \leq X_2$ or $X \leq X_3$ $$F_1 = \frac{1}{2} \int_{1.0004}^{2.44\left(\frac{0.12X_1}{h_0}+0.41\right)} \left\{ \frac{0.1711\rho_0}{0.2324^2 \left(\frac{h_m}{h_0}\right)} - \frac{1.2655}{\left[\frac{0.2324\rho_1}{0.2786(\rho_1-\rho_0)}\right]^2 \left(\frac{h_m}{h_0}\right)^2} - \frac{0.2655\sqrt{1+\frac{0.1711\rho_1\rho_0}{0.2786^2(\rho_1-\rho_0)^2} \cdot \left(\frac{h_m}{h_0}\right)}}{\left[\frac{0.2324\rho_1}{0.2786(\rho_1-\rho_0)}\right]^2 \cdot \left(\frac{h_m}{h_0}\right)^2} \right\} \cdot \frac{h_0 V_0^2 L}{2.44 \times 0.12} d\left(\frac{h_m}{h_0}\right)$$

$$= \frac{1}{2} \int_{1.0004}^{2.44\left(\frac{0.12X_1}{h_0}+0.41\right)} \left\{ \frac{0.1711\rho_0}{0.2324^2 x} - \frac{1.2655}{\left[\frac{0.2324\rho_1}{0.2786(\rho_1-\rho_0)}\right]^2 x^2} - \frac{0.2655}{\left[\frac{0.2324\rho_1}{0.2786(\rho_1-\rho_0)}\right]^2} \cdot \frac{\sqrt{1+\frac{0.1711\rho_1\rho_0}{0.2786^2(\rho_1-\rho_0)^2} \cdot x}}{\cdot x^2} \right\} \cdot \frac{h_0 V_0^2 L}{2.44 \times 0.12} dx$$

$$\int \frac{\sqrt{1+bx}}{x^2} dx = -\left( \frac{\sqrt{1+bx}}{x} - \frac{b}{2} \ln \frac{\sqrt{1+bx}-1}{\sqrt{1+bx}+1} + C \right)$$

$$F_1 = \left\{ \frac{0.1711\rho_0}{0.2324^2} \ln x + \frac{1.2655}{\left[\frac{0.2324\rho_1}{0.2786(\rho_1-\rho_0)}\right]^2 x} + \frac{0.2655}{\left[\frac{0.2324\rho_1}{0.2786(\rho_1-\rho_0)}\right]^2} \cdot \right. \tag{5}$$

$$\left. \left[ \frac{\sqrt{1+\frac{0.1711\rho_1\rho_0}{0.2786^2(\rho_1-\rho_0)^2} \cdot x}}{x} - \frac{0.1711\rho_1\rho_0}{2 \times 0.2786^2(\rho_1-\rho_0)^2} \ln \frac{\sqrt{1+\frac{0.1711\rho_1\rho_0}{0.2786^2(\rho_1-\rho_0)^2} \cdot x} - 1}{\sqrt{1+\frac{0.1711\rho_1\rho_0}{0.2786^2(\rho_1-\rho_0)^2} \cdot x} + 1} \right] \right\}_{2.44 \times 0.41}^{2.44\left(\frac{0.12X_1}{h_0}+0.41\right)} \times \frac{1}{2} \times \frac{h_0 V_0^2 L}{2.44 \times 0.12}$$

$$F_2 = \left\{ \frac{0.1711\rho_0}{0.2324^2} \ln x + \frac{1.2655}{\left[\frac{0.2324\rho_1}{0.2786(\rho_1-\rho_0)}\right]^2 x} + \frac{0.2655}{\left[\frac{0.2324\rho_1}{0.2786(\rho_1-\rho_0)}\right]^2} \cdot \right. \tag{6}$$

$$\left. \left[ \frac{\sqrt{1+\frac{0.1711\rho_1\rho_0}{0.2786^2(\rho_1-\rho_0)^2} \cdot x}}{x} - \frac{0.1711\rho_1\rho_0}{2 \times 0.2786^2(\rho_1-\rho_0)^2} \ln \frac{\sqrt{1+\frac{0.1711\rho_1\rho_0}{0.2786^2(\rho_1-\rho_0)^2} \cdot x} - 1}{\sqrt{1+\frac{0.1711\rho_1\rho_0}{0.2786^2(\rho_1-\rho_0)^2} \cdot x} + 1} \right] \right\}_{2.44 \times 0.41}^{2.44\left(\frac{0.12X_2}{h_0}+0.41\right)} \times \frac{1}{2} \times \frac{h_0 V_0^2 L}{2.44 \times 0.12}$$

ANNEX 2

When $X_2 \leq X \leq X_3$ $$F_3 = \frac{1}{2}\int_{X_2}^{X_3}\left\{\frac{0.1711\rho_0}{0.2324^2\left(\frac{h_m}{h_0}\right)} - \frac{1.2655}{\left[\frac{0.2324\rho_1}{0.2786(\rho_1-\rho_0)}\right]^2\left(\frac{h_m}{h_0}\right)^2} - \frac{0.2655\sqrt{1+\frac{0.1711\rho_1\rho_0}{0.2786^2(\rho_1-\rho_0)^2}\cdot\left(\frac{h_m}{h_0}\right)}}{\left[\frac{0.2324\rho_1}{0.2786(\rho_1-\rho_0)}\cdot\left(\frac{h_m}{h_0}\right)\right]^2}\right\} \times V_0^2[L-(x-X_2)\times\tan\alpha]dx \quad (7)$$

When force is zero in body axis direction, $$F_4 = F_5 + F_6 \quad (8)$$
$$(F_4+F_5+F_6)\sin\delta = (F_5+F_6)\sin\theta$$
$$\delta = \sin^{-1}\frac{1}{2}\sin\theta$$

$$F = n_2(F_1+F_2+F_3)\cos\beta\cos\gamma - n_2[F_4\cos\delta + F_6\sin(\phi+\gamma) - F_6\sin(\phi-\gamma)] \quad (9)$$

VTOL can be achieved once: F>G

ANNEX 2

$n_1 = 1{\sim}4$
$n_2 = 1{\sim}2$
$n_3 = 1{\sim}4$
M=29 kg/mol
Q(Air inflow of Trent 900 turbofan engine)=1204 kg/s
B(Bypass ratio of Trent 900 turbo fan engine)=8.5:1
G(Maximum take-off weight of A380)=560T
$T_0$=383K
$\rho_1$=1.293 kg/m²
Assuming:

$\theta = 36.5°$ $F_4 = \frac{1}{n_2}QV_0 = \frac{1}{2}\times 1204 \times 211 = 127002N = 13T$ $\rho_0 = \frac{MP_0}{RT_0} = \frac{101325\times 29\times 0.001}{8.31\times 383} = 0.9232$ kg/m³

$h_0 = 0.46$ m $L = 6$ m $V_0 = \dfrac{\frac{1}{n_2}\times Q \times \frac{8.5}{8.5+1}}{\rho_0\times L\times h_0} = \dfrac{\frac{1}{2}\times 1204\times\frac{8.5}{8.5+1}}{0.9232\times 6\times 0.46} = 211$ m/s $V_0' = V_0 = 211$ m/s $F_6 = \frac{1}{n_2}Q\times\frac{1}{8.5+1}\times V_0' = 11370.7368N = 1.4T$ $X_1 = 11$ m $X_2 = 18$ m $X_3 = 32$ m $\alpha = 14°$ $\beta = 5°$ $\gamma = 5°$ $\theta = 36.5°$ $\phi = 2\times 16.3°$ $$F_1 = 209832.582\left[2.9246\ln x + \frac{0.1488}{x} + 0.0312\cdot\left[\frac{\sqrt{1+19.2419x}}{x} - 9.621\ln\frac{\sqrt{1+19.2419x}-1}{\sqrt{1+19.2419x}+1}\right]_{2.44\times 0.41}^{2.44\left(\frac{0.12X_1}{h_0}+0.41\right)}\right] \quad (5)$$

$$= 209832.582\left\{2.9246\ln\frac{2.44\left(\frac{0.12\times 11}{0.46}+0.41\right)}{2.44\times 0.41} + 0.1488\left[\frac{1}{2.44\left(\frac{0.12\times 11}{0.46}+0.41\right)} - \frac{1}{2.44\times 0.41}\right] + 0.0312\cdot\left[\frac{\sqrt{1+19.2419\times 2.44\left(\frac{0.12\times 11}{0.46}+0.41\right)}}{2.44\left(\frac{0.12\times 11}{0.46}+0.41\right)} - \frac{\sqrt{1+19.2419\times 2.44\times 0.41}}{2.44\times 0.41} - 9.621\ln\frac{\sqrt{1+19.2419\times 2.44\left(\frac{0.12\times 11}{0.46}+0.41\right)}-1}{\sqrt{1+19.2419\times 2.44\left(\frac{0.12\times 11}{0.46}+0.41\right)}+1} + 9.621\ln\frac{\sqrt{1+19.2419\times 2.44\times 0.41}-1}{\sqrt{1+19.2419\times 2.44\times 0.41}+1}\right]\right\}$$

$= 209832.582[6.0811 - 0.1301 - 0.0918 - 0.0873]$ $= 1211132.68 N$ $= 124T$ $$F_2 = 209832.582\left\{2.9246\ln\frac{2.44\left(\frac{0.12\times 18}{0.46}+0.41\right)}{2.44\times 0.41} + 0.1488\left[\frac{1}{2.44\left(\frac{0.12\times 18}{0.46}+0.41\right)} - \frac{1}{2.44\times 0.41}\right] + 0.0312\cdot\left[\frac{\sqrt{1+19.2419\times 2.44\left(\frac{0.12\times 18}{0.46}+0.41\right)}}{2.44\left(\frac{0.12\times 18}{0.46}+0.41\right)} - \frac{\sqrt{1+19.2419\times 2.44\times 0.41}}{2.44\times 0.41}\right]\right. \quad (6)$$

-continued $$9.621\ln\frac{\sqrt{1+19.2419\times2.44\left(\frac{0.12\times18}{0.46}+0.41\right)}-1}{\sqrt{1+19.2419\times2.44\left(\frac{0.12\times18}{0.46}+0.41\right)}+1}+$$

$$9.621\ln\frac{1\sqrt{+19.2419\times2.44\times0.41}-1}{\sqrt{1+19.2419\times2.44\times0.41}+1}\Bigg]\Bigg\}=$$

$$209832.582[7.3757-0.1368-0.1015-0.0969]=$$

$$1477326.2936N=151T$$

$$F_3=\frac{1}{2}\int_{2.44\left(\frac{0.12X_2}{h_0}+0.41\right)}^{2.44\left(\frac{0.12X_3}{h_0}+0.41\right)}\Bigg\{\frac{0.1711\rho_0}{0.2324^2\left(\frac{h_m}{h_0}\right)}-\frac{1.2655}{\left[\frac{0.2324\rho_1}{0.2786(\rho_1-\rho_0)}\right]\left(\frac{h_m}{h_0}\right)^2}-$$

$$\frac{0.2655\sqrt{1+\frac{0.1711\rho_1\rho_0}{0.2786^2(\rho_1-\rho_0)^2}\cdot\left(\frac{h_m}{h_0}\right)}}{\left[\frac{0.2324\rho_1}{0.2786(\rho_1-\rho_0)}\cdot\left(\frac{h_m}{h_0}\right)\right]^2}\Bigg\}\times[L-$$

$$-\frac{0.2655\sqrt{1+\frac{0.1711\rho_1\rho_0}{0.2786^2(\rho_1-\rho_0)^2}\cdot x}}{\left[\frac{0.2324\rho_1}{0.2786(\rho_1-\rho_0)}\right]^2 x^2}\Bigg\}\cdot\left[1+\left(\frac{0.41h_0}{0.12\times L}+\frac{X_2}{L}\right)\cdot\tan\alpha\right]-$$

$$\left\{\frac{0.1711\rho_0}{0.2324^2}-\frac{1.2655}{\left[\frac{0.2324\rho_1}{0.2786(\rho_1-\rho_0)}\right]^2 x}-\frac{0.2655\sqrt{1+\frac{0.1711\rho_1\rho_0}{0.2786^2(\rho_1-\rho_0)^2}\cdot x}}{\left[\frac{0.2324\rho_1}{0.2786(\rho_1-\rho_0)}\right]^2 x}\right\}\frac{h_o\tan\alpha}{2.44\times0.12\times L}\Bigg\rangle$$

$$F_3=209832.582\Bigg\{1.8133\times\left[2.9246\ln x+\frac{0.1488}{x}+0.0312\cdot\left(\frac{\sqrt{1+19.2419x}}{x}-9.621\ln\frac{\sqrt{1+19.2419x}-1}{\sqrt{1+19.2419x}+1}\right)\right]-$$

-continued $$\left(\frac{h_0}{2.44\times0.12}\times\left(\frac{h_m}{h_0}\right)-\frac{0.41h_0}{0.12}-X_2\right)\times\tan\alpha\Bigg]\frac{h_0V_0^2}{2.44\times0.12}d\left(\frac{h_m}{h_0}\right)=$$

$$\frac{1}{2}\int_{2.44\left(\frac{0.12X_2}{h_0}+0.41\right)}^{2.44\left(\frac{0.12X_3}{h_0}+0.41\right)}\Bigg\{\frac{0.1711\rho_0}{0.2324^2 x}-\frac{1.2655}{\left[\frac{0.2324\rho_1}{0.2786(\rho_1-\rho_0)}\right]^2 x^2}-$$

$$\frac{0.2655\sqrt{1+\frac{0.1711\rho_1\rho_0}{0.2786^2(\rho_1-\rho_0)^2}\cdot\left(\frac{h_m}{h_0}\right)}}{\left[\frac{0.2324\rho_1}{0.2786(\rho_1-\rho_0)}\cdot x\right]^2}\Bigg\}\cdot\Bigg[L-$$

$$\left(\frac{h_0}{2.44\times0.12}x-\frac{0.41h_0}{0.12}-X_2\right)\times\tan\alpha\Bigg]\frac{h_0V_0^2}{2.44\times0.12}$$

$$dx=\frac{1}{2}\int_{2.44\left(\frac{0.12X_2}{h_0}+0.41\right)}^{2.44\left(\frac{0.12X_3}{h_0}+0.41\right)}\left\langle\frac{0.1711\rho_0}{0.2324^2 x}-\right.$$

$$\frac{1.2655}{\left[\frac{0.2324\rho_1}{0.2786(\rho_1-\rho_0)}\right]^2 x^2}$$

$$\frac{h_0V_0^2 L}{2.44\times0.12}dx\int\frac{\sqrt{1+dx}}{x}dx=2\sqrt{1+dx}-\ln\frac{\sqrt{1+dx}-1}{\sqrt{1+dx}+1}+C$$

$$0.0653\left[2.9246x - 0.1488\ln x - 0.0312\left(2\sqrt{1+19.2419x} - \ln\left(\frac{\sqrt{1+19.2419x}-1}{\sqrt{1+19.2419x}+1}\right)\right)\right]_{12.4578}^{21.3691}$$

$$= 209832.582 \tag{7}$$

$$\left\{1.8133 \times \left[2.9246\ln\frac{21.3691}{12.4578} + 0.1488\left(\frac{1}{21.3691} - \frac{1}{12.4578}\right) + \right.\right.$$
$$0.0312\left(\frac{\sqrt{1+19.2419 \times 21.3691}}{21.3691} - \right.$$
$$\frac{\sqrt{1+19.2419 \times 12.4578}}{12.4578} -$$
$$9.621\ln\frac{\sqrt{1+19.2419 \times 21.3691}-1}{\sqrt{1+19.2419 \times 21.3691}+1} +$$
$$\left.\left.9.621\ln\frac{\sqrt{1+19.2419 \times 12.4578}-1}{\sqrt{1+19.2419 \times 12.4578}+1}\right)\right] -$$
$$0.0653\left[2.9246(21.3691-12.4578) - 0.1488\ln\frac{21.3691}{12.4578} - \right.$$
$$0.0312\left(2\sqrt{1+19.2419 \times 21.3691} - \right.$$
$$2\sqrt{1+19.2419 \times 12.4578} -$$
$$\ln\frac{\sqrt{1+19.2419 \times 21.3691}-1}{\sqrt{1+19.2419 \times 21.3691}+1} +$$
$$\left.\left.\left.\ln\frac{\sqrt{1+19.2419 \times 12.4578}-1}{\sqrt{1+19.2419 \times 12.4578}+1}\right)\right]\right\} = 209832.582$$

$$\{1.8133 \times [1.5781 - 0.005 + 0.0312(-0.2953 - 0.2934)] -$$
$$0.0653[26.062 - 0.0803 - 0.0312(9.5748 - 0.0305)]\} =$$
$$239636.5129N = 24T$$

$$\delta = \sin^{-1}\left(\frac{1}{2}\sin\theta\right) \tag{8}$$
$$= \sin^{-1}\left(\frac{1}{2}\sin 36.5°\right)$$
$$= 17.3°$$

According to this sweep forward angle, low-temp planar jet enables the aircraft to keep balances during vertical take-off/landing.

$$F = n_2(F_1 + F_2 + F_3)\cos\beta\cos\gamma - \tag{9}$$
$$n_2[F_4\cos\delta + F_6\sin(\phi+\gamma) - F_6\sin(\phi-\gamma)] =$$
$$2(124 + 151 + 24)\cos 5° \cos 5° - 2[13\cos 17.3° +$$
$$1.4\sin(2 \times 16.3° + 5°) - 1.4\sin(2 \times 16.3° - 5°)] = 568\ T$$
$$F - G = 568 - 560 = 8T > 0$$

$$TWR = \frac{n_3(F_5 + F_6)}{G} = \frac{n_3 F_4}{G} = \frac{4 \times 13}{560} = 0.09 < 0.1 \tag{10}$$

It is clearly demonstrated above that VTOL is achievable on Airbus A380 once remodeled as shown, and more particularly, in case of using just two turbofan engines and thrust-to-weight ratio smaller than 0.1.

The invention claimed is:

1. An aircraft capable of vertical take-off/landing, comprising: ailerons (1, 2); a turbofan engine (3) including a low-temp duct (6) with an openable and closable propelling nozzle (7) and a high-temp duct (4) with an openable and closable propelling nozzle (5); a low-temp bypass duct (15) including an openable and closable inlet (14) connected to the low-temp duct (6), an outer wall (16), an inner wall (17) and a thin slot outlet (19) set on the upper surface of the wing and in the direction of the wingspan; and a high-temp bypass duct (9) including an openable and closable inlet (8) connected to the high-temp duct (4), an outer wall (10) and a thin slot outlet (12) set above the thin slot outlet (19) of the low-temp bypass duct (15) in the direction of the wingspan.

2. The aircraft according to claim 1 wherein the low-temp duct (6) spouts directly low-temp air (18) into the atmosphere to generate a thrust during forward flight when the propelling nozzle (7) of low-temp duct (6) is opened and the inlet (14) of the low-temp bypass duct (15) is closed.

3. The aircraft according to claim 1 wherein the high-temp duct (4) spouts directly high-temp air (11) into the atmosphere to generate another thrust during forward flight when the propelling nozzle (5) of high-temp duct (4) is opened and the inlet (8) of the high-temp bypass duct (9) is closed.

4. The aircraft according to claim 1 wherein the low-temp bypass duct (15) directs the low-temp air (18) from the low-temp duct (6) to flow, in form of low-temp planar jet (20), over the upper surface of the wing and in the direction of the wingspan, thereby generating a vertical lift and enabling the ailerons (1, 2) to control horizontal and vertical balances of the aircraft during vertical take-off/landing when the propelling nozzle (7) of low-temp duct (6) is closed and the inlet (14) of the low-temp bypass duct (15) is opened.

5. The aircraft according to claim 1 wherein the high-temp bypass duct (9) directs the high-temp air (18) from the high-temp duct (4) to flow, in form of high-temp planar jet (13), above the low-temp planar jet (20) in the direction of the wingspan, thereby generating another vertical lift and enabling the ailerons (1, 2) to control horizontal and vertical balances of the aircraft more efficiently during vertical take-off/landing when the propelling nozzle (5) of high-temp duct (4) is closed and the inlet (8) of the high-temp bypass duct (9) is opened.

6. The aircraft according to one of claims 1-5 wherein the thin slot outlet (12) of the high-temp bypass duct (9), set above the thin slot outlet (19) of the low-temp bypass duct (15), enables the high-temp planar jet (13) not to burn the upper surface of the aircraft during vertical take-off/landing.

* * * * *

UNITED STATES PATENT AND TRADEMARK OFFICE
CERTIFICATE OF CORRECTION

PATENT NO.       : 9,656,748 B2
APPLICATION NO.  : 14/329949
DATED            : May 23, 2017
INVENTOR(S)      : Chen Li Jing It is certified that error appears in the above-identified patent and that said Letters Patent is hereby corrected as shown below:

In the Drawings

Sheet 4 of 6 consisting of Figs. 10, 11 and 12 is deleted and replaced with sheet 4 of 6 consisting of Figs. 10, 11 and 12 as shown on attached page.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*

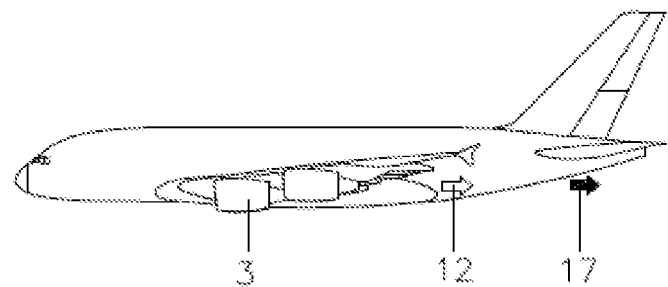
FIG10
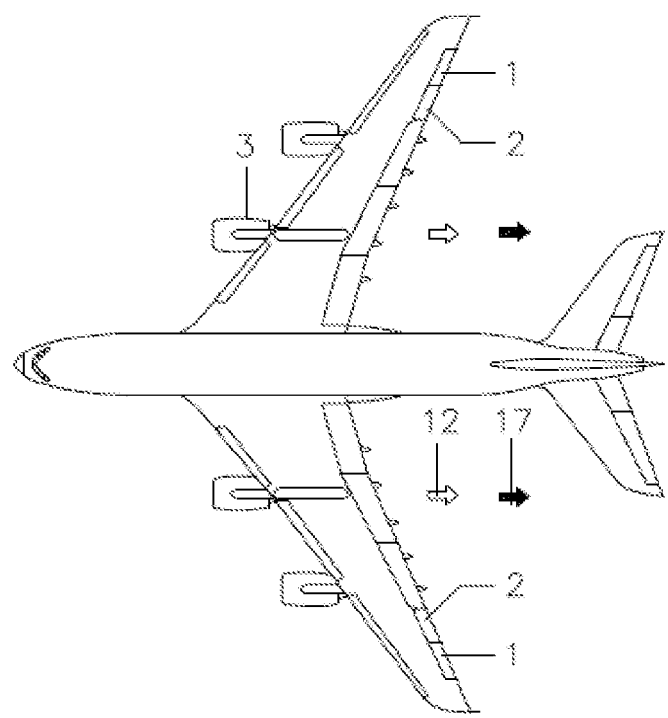
FIG11
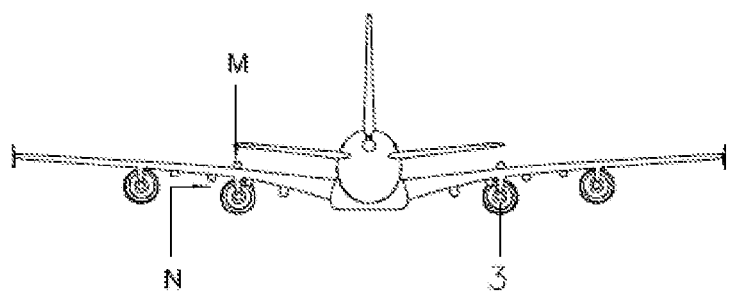
FIG12